US012103360B2

(12) United States Patent
Sato et al.

(10) Patent No.: US 12,103,360 B2
(45) Date of Patent: Oct. 1, 2024

(54) VEHICLE-MOUNTED AIR CONDITIONER CONTROL DEVICE, AND VEHICLE

(71) Applicant: MITSUBISHI HEAVY INDUSTRIES THERMAL SYSTEMS, LTD., Tokyo (JP)

(72) Inventors: Hidetaka Sato, Tokyo (JP); Tomoyasu Osaki, Tokyo (JP); Keiji Nagasaka, Tokyo (JP); Ryota Kojima, Tokyo (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 968 days.

(21) Appl. No.: 17/053,150

(22) PCT Filed: Apr. 19, 2019

(86) PCT No.: PCT/JP2019/016827
§ 371 (c)(1),
(2) Date: Nov. 5, 2020

(87) PCT Pub. No.: WO2019/235085
PCT Pub. Date: Dec. 12, 2019

(65) Prior Publication Data
US 2021/0237538 A1 Aug. 5, 2021

(30) Foreign Application Priority Data
Jun. 6, 2018 (JP) .................. 2018-108747

(51) Int. Cl.
*B60H 1/22* (2006.01)
*B60H 1/00* (2006.01)

(52) U.S. Cl.
CPC ....... *B60H 1/2218* (2013.01); *B60H 1/00278* (2013.01); *B60H 2001/00307* (2013.01); *B60H 1/00735* (2013.01)

(58) Field of Classification Search
CPC .............. B60H 1/00428; B60H 1/2215; B60H 1/2218; B60H 1/00278; B60H 1/00735; B60H 2001/00307; B60H 2004/2256
(Continued)

(56) References Cited

U.S. PATENT DOCUMENTS 5,495,908 A * 3/1996 Obara ..................... B60L 50/60
180/65.8
2009/0146594 A1* 6/2009 Nakano ................ B60H 1/3222
318/400.26
2013/0334193 A1* 12/2013 Nagami ............. B60H 1/00978
219/202

FOREIGN PATENT DOCUMENTS

CN 102449899 A * 5/2012 .......... G01R 19/165
JP 2013083519 A * 5/2013
(Continued)

OTHER PUBLICATIONS

International Search Report for International Application No. PCT/JP2019/016827, dated Jun. 18, 2019, with English translation.
(Continued)

*Primary Examiner* — Nathaniel E Wiehe
*Assistant Examiner* — Alba T Rosario-Aponte
(74) *Attorney, Agent, or Firm* — Birch, Stewart, Kolasch & Birch, LLP (57) ABSTRACT

This vehicle-mounted air conditioner control device (1) comprises: a PTC heater (H) that is included in a high-voltage system circuit (HV) and generates heat by the power supplied from a high-voltage battery (B2); and a microcomputer (10) that is included in the high-voltage system circuit (HV) and controls the power supply from the high-voltage battery (B2) to the PTC heater (H). This vehicle-mounted air conditioner control device (1) further comprises: a water temperature sensor (151, 152) that is included in a low-voltage system circuit (LV) and outputs a voltage signal
(Continued)

corresponding to the temperature of hot water; and a V/f conversion unit (161, 162) that is included in the low-voltage system circuit (LV) and converts the voltage signal output from the water temperature sensor (151, 152) into a frequency signal. This vehicle-mounted air conditioner control device (1) further comprises a digital isolator (171, 172) that transmits the frequency signal to the microcomputer (10) while maintaining electrical insulation between the V/f conversion unit (161, 162) and the microcomputer (10).

7 Claims, 5 Drawing Sheets

(58) Field of Classification Search
USPC .......................................................... 219/202
See application file for complete search history.

(56) References Cited

FOREIGN PATENT DOCUMENTS

| | | | |
|---|---|---|---|
| JP | 2014046735 A | * | 3/2014 |
| JP | 2014-108770 A | | 6/2014 |
| JP | 2015186303 A | * | 10/2015 |
| WO | WO-2015067730 A2 | * | 5/2015 ........... B60H 1/2218 |

OTHER PUBLICATIONS

Written Opinion of the International Searching Authority for International Application No. PCT/JP2019/016827, dated Jun. 18, 2019, with English translation.

* cited by examiner

VEHICLE-MOUNTED AIR CONDITIONER CONTROL DEVICE, AND VEHICLE

TECHNICAL FIELD

The present invention relates to a vehicle-mounted air conditioner control device and a vehicle.

This application claims priority based on Japanese Patent Application No. 2018-108747, filed on Jun. 6, 2018, the content of which is incorporated herein by reference.

BACKGROUND ART

In a technical field of an air conditioner that is mounted in an electric vehicle, a hybrid vehicle, or the like, there is known a vehicle-mounted air conditioner control device that heats a PTC heater by electrical conduction from a high-voltage battery mounted in a vehicle and circulates thus-generated hot water (for example, see PTL 1).

Such a vehicle-mounted air conditioner control device generally includes a microcontroller, and the microcontroller appropriately controls electrical conduction (heating) to the PTC heater based on a command from a higher-level device and various detection values from sensors.

CITATION LIST

Patent Literature

[PTL 1] Japanese Unexamined Patent Application Publication No. 2014-108770

SUMMARY OF INVENTION

Technical Problem

The above-described vehicle-mounted air conditioner control device is divided into a low-voltage system circuit that operates with reception of power supply from a low-voltage battery (a general 12 V vehicle-mounted battery) and a high-voltage system circuit that operates with reception of power supply from a high-voltage battery for motor drive. In order to secure electrical safety, the high-voltage system circuit and the low-voltage system circuit are electrically insulated.

As an aspect, since the above-described microcontroller needs to perform control while monitoring a voltage output from the high-voltage battery or a current flowing from the high-voltage battery to the PTC heater, the microcontroller is disposed in the high-voltage system circuit along with the PTC heater.

However, the microcontroller needs to further acquire a temperature (water temperature) of water heated by the PTC heater for electrical conduction control to the PTC heater. For this reason, it is considered that a water temperature sensor is also disposed in the high-voltage system circuit along with the microcontroller. Meanwhile, in order to detect the temperature of water flowing into and out from a main body, the water temperature sensor is attached to a housing frame that serves as a ground of the low-voltage system circuit. Thus, in a case where the water temperature sensor is disposed in the high-voltage system circuit, there is a possibility that a withstand voltage between the water temperature sensor and the housing frame (the ground of the low-voltage system circuit) cannot be sufficiently secured.

The invention provides a vehicle-mounted air conditioner control device and a vehicle capable of solving the above-described problem.

Solution to Problem

According to an aspect of the invention, there is provided a vehicle-mounted air conditioner control device including a heater element that is included in a high-voltage system circuit and generates heat by power supplied from a high-voltage battery, and a microcontroller that is included in the high-voltage system circuit and controls the power supplied from the high-voltage battery to the heater element. The vehicle-mounted air conditioner control device includes a water temperature sensor that is included in a low-voltage system circuit and outputs a voltage signal according to a temperature of hot water, and a V/f conversion unit for water temperature detection that is included in the low-voltage system circuit and converts the voltage signal output from the water temperature sensor into a frequency signal. The vehicle-mounted air conditioner control device includes a digital isolator for water temperature detection that transmits the frequency signal to the microcontroller while maintaining electrical insulation between the V/f conversion unit for water temperature detection and the microcontroller.

According to the aspect of the invention, the V/f conversion unit for water temperature detection includes a silicon oscillator having a setting terminal and an output terminal, and the silicon oscillator outputs, from the output terminal, the frequency signal having a frequency corresponding to a current output from the setting terminal.

According to the aspect of the invention, the vehicle-mounted air conditioner control device includes a low-voltage-side voltage sensor that is included in the low-voltage system circuit and outputs a voltage signal according to an input voltage from a low-voltage battery. The vehicle-mounted air conditioner control device includes a V/f conversion unit for low-voltage-side voltage detection that is included in the low-voltage system circuit and converts the voltage signal output from the low-voltage-side voltage sensor into a frequency signal. The vehicle-mounted air conditioner control device includes a digital isolator for low-voltage-side voltage detection that transmits the frequency signal to the microcontroller while maintaining electrical insulation between the V/f conversion unit for low-voltage-side voltage detection and the microcontroller.

According to another aspect of the invention, there is provided a vehicle including the above-described vehicle-mounted air conditioner control device.

Advantageous Effects of Invention

With the vehicle-mounted air conditioner control device and the vehicle described above, it is possible to provide a vehicle-mounted air conditioner control device and a vehicle capable of sufficiently securing a withstand voltage between the low-voltage system circuit and the high-voltage system circuit.

DESCRIPTION OF EMBODIMENTS

First Embodiment

Hereinafter, a vehicle-mounted air conditioner control device according to a first embodiment will be described referring to FIGS. 1 to 5.
(Overall Configuration of Vehicle-Mounted Air Conditioner Control Device)

Figure 1:
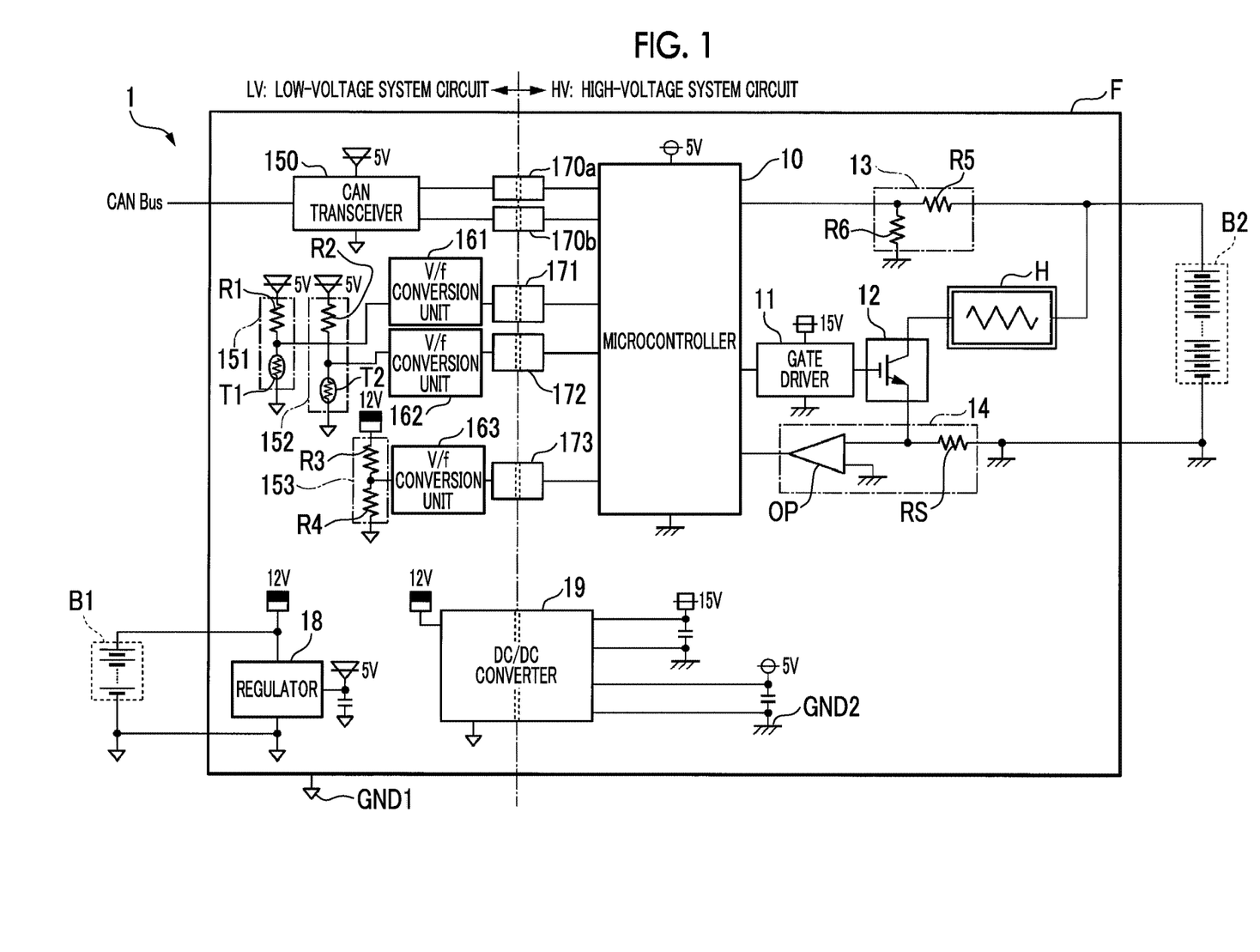
FIG. 1 is a diagram showing the overall configuration of a vehicle-mounted air conditioner control device according to a first embodiment.

FIG. 1 is a diagram showing the overall configuration of the vehicle-mounted air conditioner control device according to the first embodiment.

A vehicle-mounted air conditioner control device 1 shown in FIG. 1 is an air conditioner control device that is mounted in a vehicle, such as an electric vehicle or a hybrid vehicle. The vehicle-mounted air conditioner control device 1 makes a PTC heater H generate heat by electrical conduction from a high-voltage battery B2 (a high-voltage battery for motor drive) mounted in an electric vehicle, a hybrid vehicle, or the like, and generates hot water necessary for in-vehicle air conditioning.

As shown in FIG. 1, the vehicle-mounted air conditioner control device 1 has a low-voltage system circuit LV and a high-voltage system circuit HV. A ground GND1 of the low-voltage system circuit LV and a ground GND2 of the high-voltage system circuit HV are insulated. The ground GND1 of the low-voltage system circuit LV is electrically connected to a housing frame F. A low-voltage battery B1 (for example, a DC 12 V output vehicle-mounted battery) that is mounted in the vehicle is connected to the low-voltage system circuit LV. A high-voltage battery B2 (for example, a DC 300 V output vehicle-mounted battery) that is mounted in the vehicle is connected to the high-voltage system circuit HV. The high-voltage power supply B2 is a main power supply source that rotationally drives a motor for vehicle drive.

The high-voltage system circuit HV of the vehicle-mounted air conditioner control device 1 includes a microcontroller 10, a gate driver 11, a switching element 12, a high-voltage-side voltage sensor 13, and a current detection sensor 14. The low-voltage system circuit LV of the vehicle-mounted air conditioner control device 1 includes a CAN transceiver 150, an inlet-side water temperature sensor 151, an outlet-side water temperature sensor 152, a low-voltage-side voltage sensor 153, V/f conversion units 161, 162, and 163, and a regulator 18.

The vehicle-mounted air conditioner control device 1 includes digital isolators 170, 171, 172, and 173 and a DC/DC converter 19 that are disposed over the boundary between the low-voltage system circuit LV and the high-voltage system circuit HV.

Hereinafter, various circuit configurations included in the high-voltage system circuit HV will be described in detail.

The microcontroller 10 is a processor that controls the entire operation of the vehicle-mounted air conditioner control device 1. The microcontroller 10 executes various kinds of processing in compliance with a program prepared in advance. Specifically, the microcontroller 10 controls electrical conduction to the PTC heater H based on a command value (a temperature command value of hot water, or the like) received from a higher-level device, detection results of an inlet temperature and an outlet temperature of hot water heated by the PTC heater H, and the like. The microcontroller 10 continuously monitors an input voltage from the low-voltage battery B1 and an input voltage from the high-voltage battery B2, and performs abnormality detection and the like for the low-voltage battery B1 and the high-voltage battery B2.

As shown in FIG. 1, the microcontroller 10 is driven, for example, with a power supply voltage of DC 5 V based on the ground GND2. A ground terminal of the microcontroller 10 is connected to the ground GND2 of the high-voltage system circuit HV.

The gate driver 11 controls the on and off of the switching element 12 based on a control signal from the microcontroller 10. The gate driver 11 is driven, for example, with a power supply voltage of DC 15 V based on the ground GND2. A ground terminal of the gate driver 11 is connected to the ground GND2 of the high-voltage system circuit HV.

The switching element 12 is a high-withstand voltage semiconductor switching element (so-called power transistor), and is, for example, an insulated gate bipolar transistor (IGBT) or the like. The switching element 12 is controlled to be on and off based on a gate signal from the gate driver 11. When the switching element 12 is ON, a current flows from the high-voltage battery B2 (DC 300 V) to the PTC heater H, and the PTC heater H is heated.

The high-voltage-side voltage sensor 13 is a sensor that detects the input voltage from the high-voltage battery B2. Specifically, the high-voltage-side voltage sensor 13 is a voltage divider that has resistive elements R5 and R6. The input voltage (for example, DC 300 V) from the high-voltage battery B2 is divided by the high-voltage-side voltage sensor 13 (voltage divider). With such a configuration, the high-voltage-side voltage sensor 13 outputs a voltage signal (analog signal) corresponding to the input voltage from the high-voltage battery B2 toward the microcontroller 10.

The current detection sensor 14 is a sensor that detects a current flowing in the PTC heater H. Specifically, the current detection sensor 14 has a resistive element RS that is a shunt resistor, and an amplifier OP. With the current detection sensor 14, a voltage drop occurs in the resistive element RS according to the amount of the current flowing in the PTC heater H. Then, the voltage drop in the resistive element RS is amplified by the amplifier OP and is input to the microcontroller 10.

The PTC heater H is a heater element that generates heat by power supplied from the high-voltage battery B2.

Next, various circuit configurations included in the low-voltage system circuit LV will be described in detail.

The CAN transceiver 150 is connected to a CAN bus, and realizes bi-directional communication between the higher-level device (not shown), to which the CAN transceiver 150 is connected through the CAN bus, and the microcontroller 10. For example, the CAN transceiver 150 transmits a command signal (digital signal) on the microcontroller 10 received from the higher-level device to the microcontroller 10 through digital isolators 170a and 170b described below.

The CAN transceiver 150 is driven, for example, with a power supply voltage of DC 5 V based on the ground GND1. A ground terminal of the CAN transceiver 150 is connected to the ground GND1 of the low-voltage system circuit LV. In other embodiments, the CAN transceiver 150 may be other communication driver ICs (LIN transceiver and the like).

Each of the inlet-side water temperature sensor 151 and the outlet-side water temperature sensor 152 is a temperature sensor that detects the temperature of hot water heated by the PTC heater H. Specifically, the inlet-side water temperature sensor 151 is provided near an inlet of a flow path (not shown) of hot water in the housing frame F and detects a hot water inlet temperature. The outlet-side water temperature sensor 152 is provided near an outlet of the flow path of hot water in the housing frame F and detects a hot water outlet temperature.

The inlet-side water temperature sensor 151 and the outlet-side water temperature sensor 152 are driven, for example, with the power supply voltage of DC 5 V based on the ground GND1. Ground terminals of the inlet-side water temperature sensor 151 and the outlet-side water temperature sensor 152 are connected to the ground GND1 of the low-voltage system circuit LV.

The inlet-side water temperature sensor 151 has a resistive element R1 and a temperature sensor element T1 that are connected in series between the power supply and the ground. The temperature sensor element T1 becomes a resistance value corresponding to a detected temperature. With such a configuration, the inlet-side water temperature sensor 151 outputs a voltage signal (analog signal) according to the inlet temperature.

The outlet-side water temperature sensor 152 has a resistive element R2 and a temperature sensor element T2 that are connected in series between the power supply and the ground. The temperature sensor element T2 becomes a resistance value corresponding to the detected temperature. With such a configuration, the outlet-side water temperature sensor 152 outputs a voltage signal (analog signal) according to the outlet temperature.

The low-voltage-side voltage sensor 153 is a sensor that detects the input voltage from the low-voltage battery B1. Specifically, the low-voltage-side voltage sensor 153 is a voltage divider that has resistive elements R3 and R4. The input voltage (for example, DC 12 V) from the low-voltage battery B1 is divided by the low-voltage-side voltage sensor 153 (voltage divider). With such a configuration, the low-voltage-side voltage sensor 153 outputs a voltage signal (analog signal) corresponding to the input voltage from the low-voltage battery B1.

A ground terminal of the low-voltage-side voltage sensor 153 is connected to the ground GND1 of the low-voltage system circuit LV.

The V/f conversion units 161, 162, and 163 receive the voltage signals (analog signals) output from the inlet-side water temperature sensor 151, the outlet-side water temperature sensor 152, and the low-voltage-side voltage sensor 153, respectively, and convert the voltage signals into frequency signals that oscillate at frequencies corresponding to the voltage signals.

The V/f conversion units 161 and 162 (V/f conversion units for water temperature detection) convert the voltage signals output from the water temperature sensors 151 and 152 into the frequency signals, respectively. The V/f conversion unit 163 (a V/f conversion unit for low-voltage-side voltage detection) converts the voltage signal output from the low-voltage-side voltage sensor 153 into the frequency signal.

Each of the digital isolators 170a, 171, 172, and 173 is, for example, a photocoupler or the like, and is an element that enables transmission of a digital signal input from a primary side (low-voltage system circuit LV) to a secondary side (high-voltage system circuit HV) while maintaining electrical insulation between the primary side and the secondary side. The digital isolator 170b is an element that enables transmission of a digital signal input from the secondary side to the primary side while maintaining electrical insulation between the primary side and the secondary side similarly.

The digital isolators 170a and 170b transmit the digital signals input and output from the CAN transceiver 150 to the microcontroller 10 while maintaining electrical insulation between the CAN transceiver 150 and the microcontroller 10. With this, bi-directional communication between the microcontroller and the CAN transceiver 150 is realized.

The digital isolators 171 and 172 (digital isolators for water temperature detection) transmit the frequency signals output from the V/f conversion units 161 and 162 to the microcontroller 10 while maintaining electrical insulation between the V/f conversion units 161 and 162 and the microcontroller 10, respectively.

The digital isolator 173 (a digital isolator for low-voltage-side voltage detection) transmits the frequency signal output from the V/f conversion unit 163 to the microcontroller 10 while maintaining electrical insulation between the V/f conversion unit 163 and the microcontroller 10.

The regulator 18 outputs, based on the input voltage (for example, DC 12 V) from the low-voltage battery B1, a constant voltage (for example, DC 5 V) lower than the input voltage. The constant voltage generated by the regulator 18 becomes a power supply voltage of the CAN transceiver 150, the inlet-side water temperature sensor 151, the outlet-side water temperature sensor 152, and the like belonging to the low-voltage system circuit LV.

The DC/DC converter 19 is a so-called insulation type DC/DC converter, and converts a DC voltage input from the primary side into a desired DC voltage and outputs the converted DC voltage to the secondary side while maintaining electrical insulation between the primary side (low-voltage system circuit LV) and the secondary side (high-voltage system circuit HV). Specifically, the DC/DC converter 19 is input with the input voltage (for example, DC 12 V) from the low-voltage battery B1 based on the ground GND1 of the primary side (low-voltage system circuit LV) and converts the input voltage into a constant voltage (for example, DC 5 V, DC 15 V) based on the ground GND2 of the secondary side (high-voltage system circuit HV). The constant voltage generated by the DC/DC converter 19 becomes a power supply voltage of the microcontroller 10, the gate driver 11, and the like belonging to the high-voltage system circuit HV.

(Circuit Configuration and Function of V/f Conversion Unit for Water Temperature Detection)

Figure 2:
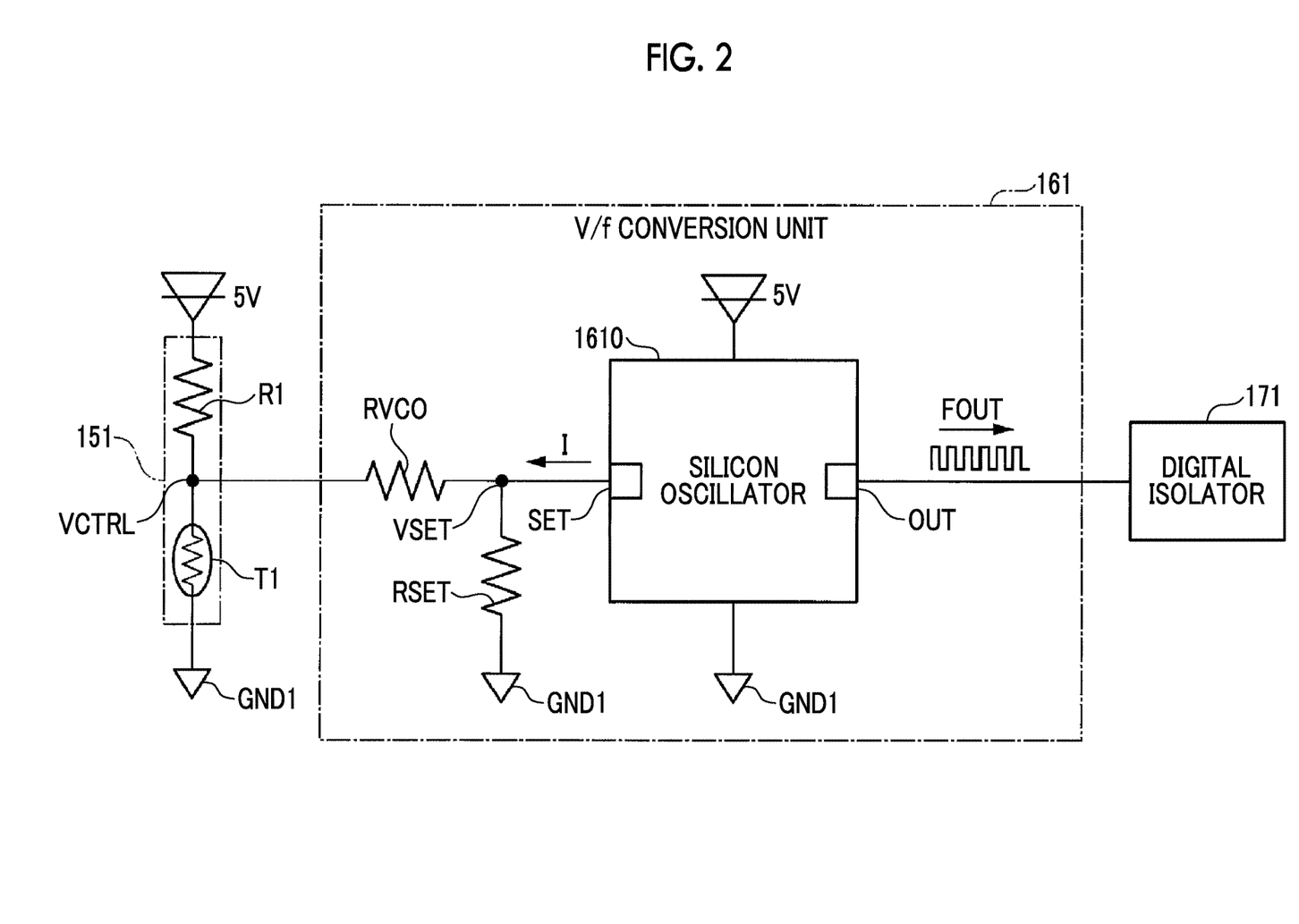
FIG. 2 is a first view showing the detailed circuit configuration of a V/f conversion unit according to the first embodiment.

FIG. 2 is a first view showing the detailed circuit configuration of the V/f conversion unit according to the first embodiment.

Figure 3:
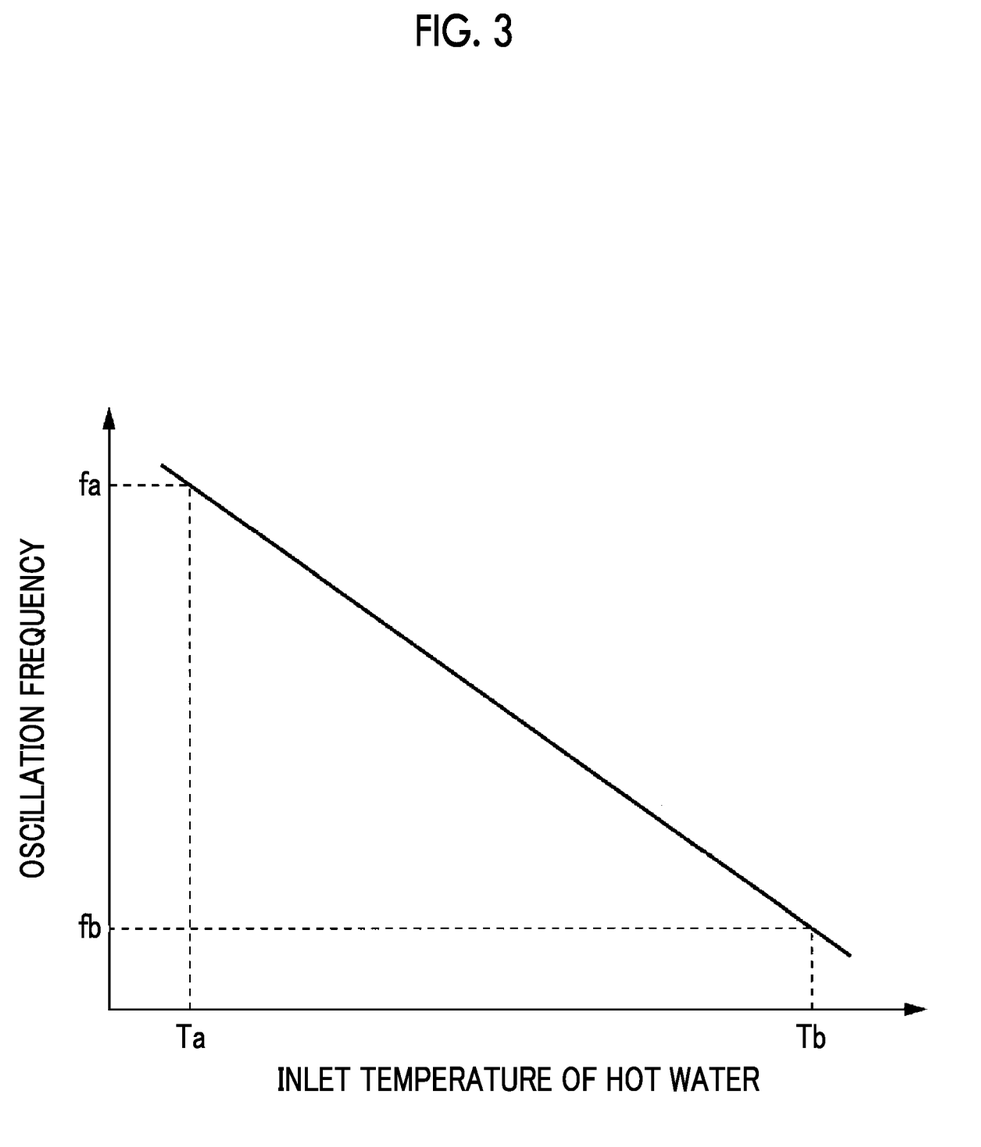
FIG. 3 is a first view illustrating a function of the V/f conversion unit according to the first embodiment.

FIG. 3 is a first view illustrating the function of the V/f conversion unit according to the first embodiment.

Hereinafter, the circuit configurations and the functions of the V/f conversion units 161 and 162 (V/f conversion units for water temperature detection) will be described in detail referring to FIGS. 2 and 3. Although only the circuit configuration of the V/f conversion unit 161 is shown in FIG. 2, the circuit configuration of the V/f conversion unit 162 is substantially the same as the circuit configuration of the V/f conversion unit 161, and thus, is not shown in the drawing.

As shown in FIG. 2, the V/f conversion unit 161 has a silicon oscillator 1610 and resistive elements RVCO and RSET. The silicon oscillator 1610 is input with a power supply voltage 5 V and is grounded to the ground GND1.

The silicon oscillator 1610 has a setting terminal SET and an output terminal OUT. The setting terminal SET of the silicon oscillator 1610 allows a current I to flow such that a potential of a setting node VSET connected to the terminal is fixed at a predetermined value. Then, the output terminal OUT of the silicon oscillator 1610 outputs a frequency signal FOUT having a frequency according to the amount of the current I flowing from the setting terminal SET.

The resistive element RVCO is connected between the setting node VSET and an output node VCTRL (an intermediate potential between the resistive element R1 and the temperature sensor element T1 connected in series) from which the voltage signal (analog signal) according to the inlet temperature of hot water is output. The resistive element RSET is connected between the setting node VSET and the ground GND1.

According to the configuration described above, as shown in FIG. 3, for example, in a case where the inlet temperature of hot water is a relatively low temperature Ta, the resistance value of the temperature sensor element T1 becomes low and a potential of the output node VCTRL is lowered. Thus, in order to maintain a predetermined potential on the setting node VSET, there is a need to allow a relatively large current I to flow from the setting terminal SET. Accordingly, in this case, the silicon oscillator 1610 outputs the frequency signal FOUT having a relatively high frequency fa from the output terminal OUT.

On the other hand, as shown in FIG. 3, in a case where the inlet temperature of hot water is a relatively high temperature Tb, the resistance value of the temperature sensor element T1 becomes high and the potential of the output node VCTRL is raised. Thus, in order to maintain a predetermined potential on the setting node VSET, there is a need to allow a relatively small current I to flow from the setting terminal SET. Accordingly, in this case, the silicon oscillator 1610 outputs the frequency signal FOUT having a relatively low frequency fb from the output terminal OUT.

With the relationship shown in FIG. 3, the microcontroller 10 can ascertain the inlet temperature of hot water through an oscillation frequency of the frequency signal FOUT (digital signal) input by way of the digital isolator 171.
(Circuit Configuration and Function of V/f Conversion Unit for Low-Voltage-Side Voltage Detection)

Figure 4:
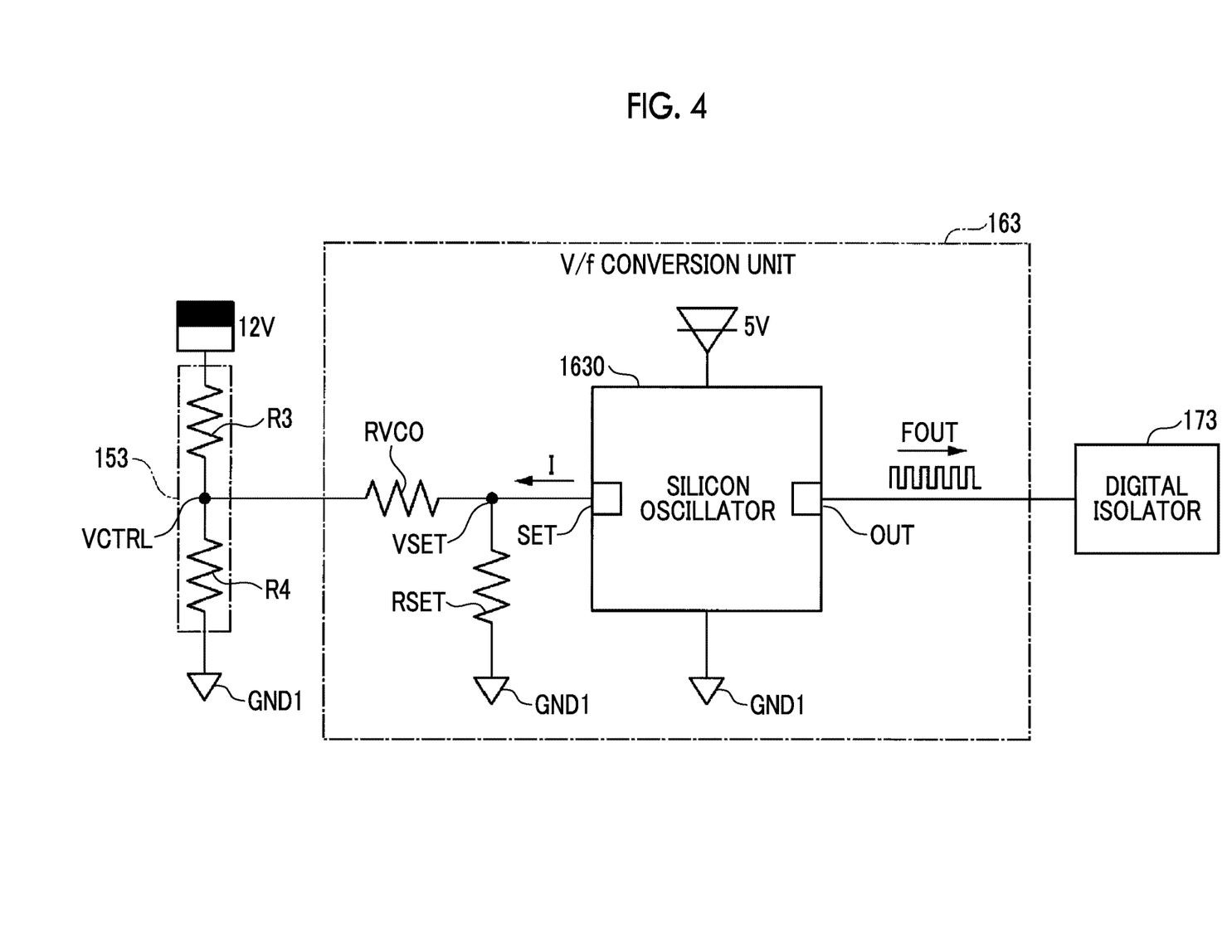
FIG. 4 is a second view showing the detailed circuit configuration of a V/f conversion unit according to the first embodiment.

FIG. 4 is a second view showing the detailed circuit configuration of the V/f conversion unit according to the first embodiment.

Figure 5:
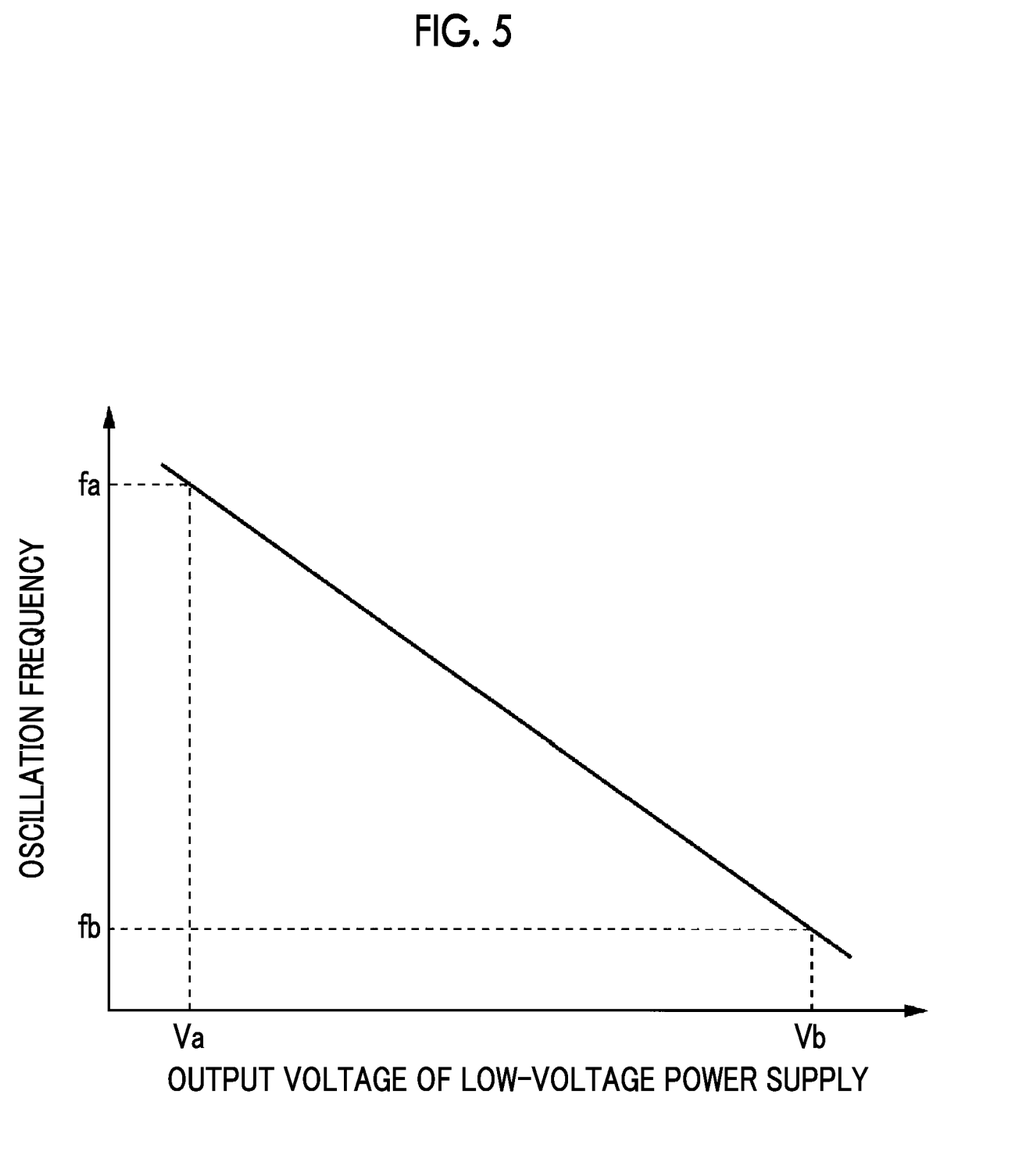
FIG. 5 is a second view illustrating a function of the V/f conversion unit according to the first embodiment.

FIG. 5 is a second view illustrating the function of the V/f conversion unit according to the first embodiment.

Hereinafter, the circuit configuration and the function of the V/f conversion unit 163 (a V/f conversion unit for low-voltage-side voltage detection) will be described in detail referring to FIGS. 4 and 5.

As shown in FIG. 4, the V/f conversion unit 163 has a silicon oscillator 1630 and resistive elements RVCO and RSET. The silicon oscillator 1630 is input with the power supply voltage 5 V and is grounded to the ground GND1.

Similarly to the silicon oscillator 1610, the silicon oscillator 1630 has a setting terminal SET and an output terminal OUT. The setting terminal SET of the silicon oscillator 1630 allows a current I to flow such that a potential of a setting node VSET connected to the terminal is fixed at a predetermined value. Then, the output terminal OUT of the silicon oscillator 1630 outputs a frequency signal FOUT having a frequency according to a value of the current I flowing from the setting terminal SET.

A resistive element RVCO is connected between the setting node VSET and an output node VCTRL (an intermediate potential between a resistive element R3 and a resistive element R4 connected in series) from which the voltage signal (analog signal) according to the input voltage from the low-voltage battery B1 is output. A resistive element RSET is connected between the setting node VSET and the ground GND1.

According to the configuration described above, as shown in FIG. 5, for example, in a case where the input voltage from the low-voltage battery B1 is a relatively low voltage Va, the potential of the output node VCTRL of the low-voltage-side voltage sensor 153 is lowered. Thus, in order to maintain a predetermined potential on the setting node VSET, there is a need to allow a relatively large current I to flow from the setting terminal SET. Accordingly, in this case, the silicon oscillator 1610 outputs the frequency signal FOUT having a relatively high frequency fa from the output terminal OUT.

On the other hand, as shown in FIG. 5, in a case where the input voltage from the low-voltage battery B1 is a relatively high voltage Vb, the potential of the output node VCTRL of the low-voltage-side voltage sensor 153 is raised. Thus, in order to maintain a predetermined potential on the setting node VSET, there is a need to allow a relatively small current I to flow from the setting terminal SET. Accordingly, in this case, the silicon oscillator 1630 outputs the frequency signal FOUT having a relatively low frequency fb from the output terminal OUT.

With the relationship shown in FIG. 5, the microcontroller 10 can ascertain the input voltage from the low-voltage battery B1 through an oscillation frequency of the frequency signal FOUT input by way of the digital isolator 173.
(Operations and Effects)

As described above, the vehicle-mounted air conditioner control device 1 according to the first embodiment includes, in the high-voltage system circuit HV, the PTC heater H that generates heat by power supplied from the high-voltage battery B2, and the microcontroller 10 that controls power supplied from the high-voltage battery B2 to the PTC heater H. The vehicle-mounted air conditioner control device 1 includes, in the low-voltage system circuit LV, the water temperature sensors 151 and 152 that output the voltage signals according to the temperature of hot water, and the V/f conversion units for water temperature detection (V/f conversion units 161 and 162) that convert the voltage signals output from the water temperature sensors 151 and 152 into the frequency signals. The vehicle-mounted air conditioner control device 1 includes the digital isolators for water temperature detection (digital isolators 171 and 172) that transmit the frequency signals output from the V/f conversion units 161 and 162 to the microcontroller 10 while maintaining electrical insulation between the V/f conversion units 161 and 162 and the microcontroller 10.

Here, for the purpose of facilitating communication with the microcontroller 10 belonging to the high-voltage system circuit HV, in a case where the inlet-side water temperature sensor 151 and the outlet-side water temperature sensor 152 are connected to the high-voltage system circuit HV, the following concern occurs. That is, since both of the temperature sensor elements T1 and T2 of the inlet-side water temperature sensor 151 and the outlet-side water temperature sensor 152 are used in a state attached to the housing frame F, in this case, insulating films of the temperature sensor elements T1 and T2 are narrowed between the ground GND2 of the high-voltage system circuit HV and the ground GND1 of the low-voltage system circuit LV. Thus, it is supposed that, in a case where a water temperature sensor with no high-withstand voltage specification is used, a withstand voltage between the low-voltage system circuit LV and the high-voltage system circuit HV is not sufficiently secured. In many cases, a normal water temperature sensor does not have high-withstand voltage insulation performance for improvement of a thermal conductivity characteristic and low cost.

A case where a microcontroller is provided in each of the high-voltage system circuit HV and the low-voltage system circuit LV, and communication (exchange of digital signal) between both microcontrollers is performed through the digital isolators is also considered. However, in this case, two microcontrollers need to be mounted in the vehicle-mounted air conditioner control device 1, causing an increase in cost.

With the configuration of the first embodiment, the microcontroller 10 can acquire temperature detection signals from the inlet-side water temperature sensor 151 and the outlet-side water temperature sensor 152 included in the low-voltage system circuit LV through the V/f conversion units 161 and 162 and the digital isolators 171 and 172 while belonging to the high-voltage system circuit HV. Accordingly, it is possible to sufficiently secure a withstand voltage between the low-voltage system circuit and the high-voltage system circuit, and to suppress an increase in cost.

Each of the V/f conversion units 161 to 163 according to the first embodiment includes the silicon oscillator 1610 having the setting terminal SET and the output terminal OUT, and the like. The silicon oscillator 1610 outputs, from the output terminal OUT, the frequency signal having the frequency corresponding to the current output from the setting terminal SET.

With such a configuration, it is possible to convert the voltage signal into the frequency signal through the silicon oscillator 1610 that has a function capable of setting the oscillation frequency of the signal to be output as desired. With this, it is possible to configure the V/f conversion units 161, 162, and 163 at low cost.

The vehicle-mounted air conditioner control device 1 according to the first embodiment further includes, in the low-voltage system circuit LV, the low-voltage-side voltage sensor 153 that outputs the voltage signal according to the input voltage from the low-voltage battery B1, and the V/f conversion unit for low-voltage-side voltage detection (V/f conversion unit 163) that converts the voltage signal output from the low-voltage-side voltage sensor 153 into the frequency signal. In addition, the vehicle-mounted air conditioner control device 1 includes the digital isolator for low-voltage-side voltage detection (digital isolator 173) that transmits the frequency signal to the microcontroller 10 while maintaining electrical insulation between the V/f conversion unit for low-voltage-side voltage detection and the microcontroller 10.

In this way, the microcontroller 10 disposed in the high-voltage system circuit HV can monitor the input voltage from the low-voltage battery B1 through the V/f conversion unit 163 and the digital isolator 173. With this, the microcontroller 10 can detect an abnormality for the low-voltage battery B1 as well as the high-voltage battery B2.

As described above, although several embodiments of the invention have been described above, the embodiments are presented as only examples, and thus, are not intended to limit the scope of the invention. The above-described embodiments can be carried out in other various forms, and various omissions, replacements, and alterations may be made within the scope without departing from the spirit of the invention. The above-described embodiments and modification examples thereof are included in the inventions disclosed in the claims and equivalents thereof as included in the scope and the spirit of the invention.

INDUSTRIAL APPLICABILITY

With the vehicle-mounted air conditioner control device and the vehicle described above, it is possible to provide a vehicle-mounted air conditioner control device and a vehicle capable of sufficiently securing a withstand voltage between the low-voltage system circuit and the high-voltage system circuit.

REFERENCE SIGNS LIST

1: vehicle-mounted air conditioner control device
10: microcontroller
11: gate driver
12: switching element
13: high-voltage-side voltage sensor
14: current detection sensor
150: CAN transceiver
151: inlet-side water temperature sensor
152: outlet-side water temperature sensor
153: low-voltage-side voltage sensor
161, 162, 163: V/f conversion unit
1610, 1630: silicon oscillator
170a, 170b, 171, 172, 173: digital isolator
18: regulator
19: DC/DC converter
H: PTC heater
R1, R2, R3, R4, R5, R6, RS, RVCO, RSET: resistive element
OP: amplifier
T1, T2: temperature sensor element
F: housing frame
B1: low-voltage battery
B2: high-voltage battery

The invention claimed is:

1. A vehicle-mounted air conditioner control device comprising:
   a heater element that is included in a, high-voltage system circuit and generates heat by power supplied from a high-voltage battery;
   a microcontroller that is included in the high-voltage system circuit and controls the power supplied from the high-voltage battery to the heater element;
   a water temperature sensor that is included in a low-voltage system circuit and outputs a voltage signal according to a temperature of hot water;
   a first V/f conversion unit for water temperature detection that is included in the low-voltage system circuit and converts the voltage signal output from the water temperature sensor into a frequency signal; and
   a first digital isolator for water temperature detection that transmits the frequency signal to the microcontroller while maintaining electrical insulation between the first V/f conversion unit for water temperature detection and the microcontroller.

2. The vehicle-mounted air conditioner control device according to claim 1,
   wherein the first V/f conversion unit for water temperature detection includes
   a silicon oscillator having a setting terminal and an output terminal, and
   the silicon oscillator outputs, from the output terminal, the frequency signal having a frequency corresponding to a current output from the setting terminal.

3. The vehicle-mounted air conditioner control device according to claim 1, further comprising:
- a low-voltage-side voltage sensor that is included in the low-voltage system circuit and outputs a voltage signal according to an input voltage from a low-voltage battery;
- a second V/f conversion unit for low-voltage-side voltage detection that is included in the low-voltage system circuit and converts the voltage signal output from the low-voltage-side voltage sensor into a frequency signal; and
- a second digital isolator for low-voltage-side voltage detection that transmits the frequency signal to the microcontroller while maintaining electrical insulation between the second V/f conversion unit for low-voltage-side voltage detection and the microcontroller.

4. A vehicle comprising:
the vehicle-mounted air conditioner control device according to claim 1.

5. The vehicle-mounted air conditioner control device according to claim 2, further comprising:
- a low-voltage-side voltage sensor that is included in the low-voltage system circuit and outputs a voltage signal according to an input voltage from a low-voltage battery;
- a second V/f conversion unit for low-volt ag-side voltage detection that is included in the low-voltage system circuit and converts the voltage signal output from the low-voltage-side voltage sensor into a frequency signal; and
- a second digital isolator for low-voltage-side voltage detection that transmits the frequency signal to the microcontroller while maintaining electrical insulation between the second V/f conversion unit for low-voltage-side voltage detection and the microcontroller.

6. A vehicle comprising:
the vehicle-mounted air conditioner control device according to claim 2.

7. A vehicle comprising:
the vehicle-mounted air conditioner control device according to claim 3.

\* \* \* \* \*